(12) United States Patent
Mukherjee et al.

(10) Patent No.: US 10,282,299 B2
(45) Date of Patent: May 7, 2019

(54) MANAGING CACHE PARTITIONS BASED ON CACHE USAGE INFORMATION

(71) Applicant: Cavium, LLC, Santa Clara, CA (US)

(72) Inventors: Shubhendu Sekhar Mukherjee, Southborough, MA (US); David Asher, Sutton, MA (US); Wilson P. Snyder, II, Holliston, MA (US)

(73) Assignee: Cavium, LLC, Santa Clara, CA (US)

( * ) Notice: Subject to any disclaimer, the term of this patent is extended or adjusted under 35 U.S.C. 154(b) by 15 days.

(21) Appl. No.: 15/631,085

(22) Filed: Jun. 23, 2017

(65) Prior Publication Data

US 2018/0373635 A1 Dec. 27, 2018

(51) Int. Cl.
*G06F 12/08* (2016.01)
*G06F 12/0846* (2016.01)
*G06F 12/0864* (2016.01)
*G06F 12/084* (2016.01)

(52) U.S. Cl.
CPC ........ *G06F 12/0848* (2013.01); *G06F 12/084* (2013.01); *G06F 12/0864* (2013.01); *G06F 2212/282* (2013.01); *G06F 2212/314* (2013.01)

(58) Field of Classification Search
CPC . G06F 12/0848; G06F 12/084; G06F 12/0864
USPC ................................................ 711/128, 146
See application file for complete search history.

(56) References Cited

U.S. PATENT DOCUMENTS

| | | | |
|---|---|---|---|
| 5,434,992 A | 7/1995 | Mattson | |
| 6,587,937 B1 | 7/2003 | Jensen et al. | |
| 6,591,347 B2 | 7/2003 | Tischler et al. | |
| 6,662,272 B2 | 12/2003 | Olarig et al. | |
| 6,871,264 B2 | 3/2005 | Soltis, Jr. | |
| 6,996,679 B2 | 2/2006 | Cargnoni et al. | |
| 7,318,124 B2 | 1/2008 | Hama et al. | |
| 8,745,618 B2 | 6/2014 | Lin et al. | |
| 9,081,501 B2 * | 7/2015 | Asaad | G06F 15/76 |
| 9,336,147 B2 | 5/2016 | Kotla et al. | |

(Continued)

OTHER PUBLICATIONS

Intel, "Increasing Platform Determinism with Platform Quality of Service for the Data Plane Development Kit," White Paper, Feb. 2016, Document No. 333742-001US, 25 pages.

(Continued)

*Primary Examiner* — Pierre Miche Bataille
(74) *Attorney, Agent, or Firm* — Young Basile Hanlon & MacFarlane, P.C.

(57) ABSTRACT

Partition information includes entries that each include an entity identifier and associated cache configuration information. A controller manages memory requests originating from processor cores, including: comparing at least a portion of an address included in a memory request with tags stored in a cache to determine whether the memory request results in a hit or a miss, and comparing an entity identifier included in the memory request with stored entity identifiers to determine a matched entry. The cache configuration information associated with the entity identifier in a matched entry is updated based at least in part on a hit or miss result. The associated cache configuration information includes cache usage information that tracks usage of the cache by an entity associated with the particular entity identifier, and partition descriptors that each define a different group of one or more of the regions.

20 Claims, 3 Drawing Sheets

(56) References Cited

U.S. PATENT DOCUMENTS

| | | | |
|---|---|---|---|
| 9,645,945 B2* | 5/2017 | Meredith | G06F 12/128 |
| 2009/0300293 A1* | 12/2009 | Mantor | G06F 12/0817 |
| | | | 711/141 |
| 2010/0280806 A1* | 11/2010 | Bowers | G06F 19/701 |
| | | | 703/6 |
| 2014/0201452 A1* | 7/2014 | Meredith | G06F 12/128 |
| | | | 711/130 |
| 2016/0283246 A1 | 9/2016 | Fleming et al. | |
| 2016/0342514 A1 | 11/2016 | Wang et al. | |
| 2016/0357680 A1* | 12/2016 | Hooker | G06F 8/4442 |
| 2016/0357686 A1* | 12/2016 | Waldspurger | G06F 12/0893 |

OTHER PUBLICATIONS

Intel, "Improving Real-Time Performance by Utilizing Cache Allocation Technology, Enhancing Performance via Allocation of the Processor's Cache, White Paper," Apr. 2015, Document No. 331843-001US, 16 pages.

Qureshi et al., "Utility-Based Cache Partitioning: A Low-Overhead, High-Performance, Runtime Mechanism to Partition Shared Caches," The $39^{th}$ Annual IEEE/ACM International Symposium on Microarchitecture, IEEE, 2006, 10 pages.

Sahu et al., "Creating Heterogeneity at Run Time by Dynamic Cache and Bandwidth Partitioning Schemes," SAC '14, Mar. 24-28, 2014, Gyeongju, Korea, pp. 872-879.

Suh, et al., "Dynamic Cache Partitioning for Simultaneous Multithreading Systems," Computer Science and Artificial Intelligence Laboratory, Massachusetts Institute of Technology, in the proceedings of the IASTED International Conference on Parallel and Distributed Computing and Systems, Aug. 2001, Computation Structures Group, Memo 446, 8 pages.

Wang et al., An Analytical Performance Model for Partitioning Off-Chip Memory Bandwidth, Proceeding IPDPS '13 Proceedings of the 2013 IEEE $27^{th}$ International Symposium on Parallel and Distributed Processing, pp. 165-176, 12 pages, May 2013.

* cited by examiner

MANAGING CACHE PARTITIONS BASED ON CACHE USAGE INFORMATION

BACKGROUND

This description relates to managing cache partitions based on cache usage information.

Many modern processors support hierarchical cache systems with multiple levels of cache, including one or more levels within the processor or within each core of a multi-core processor, and one or more levels external to the processor or cores, up to a last level cache (LLC) that is accessed just before main memory is accessed. At each level of the hierarchy, the cache stores copies of a subset of data to speed access to that data by the processor relative to the speed of a higher level cache (or relative to the speed of the main memory for the LLC). Lower level caches are closer to the processor (or core), whereas higher level caches are further away from the processor (or core). The LLC is typically shared by all of the cores of a multi-core processor. At each level, the cache system will load blocks of data into entries and evict blocks of data from entries in units of "cache lines" (also called "cache blocks"). Each cache line includes a number of "words" of data, each word consisting of a predetermined number of bytes.

A technique called "cache partitioning" (also called "cache allocation") involves managing the way in which a particular cache is shared among multiple entities. For example, these entities may be different cores and the particular cache that is shared among the cores may be the LLC. In some examples, the management involves limiting a particular core to allocating new cache lines only within a particular assigned region of the LLC. By doing so, the cache will still be able to access data upon a hit in any region, but is limited to allocating (and if necessary evicting) data upon a miss only in its assigned region.

SUMMARY

In one aspect, in general, an apparatus includes: a plurality of processor cores, with each of the plurality of processor cores including storage configured to store at least one core-specific identifier; and a shared memory system connected by interconnection circuitry to each of the plurality of processor cores. The shared memory system includes: a cache shared by more than one of the plurality of processor cores, the cache comprising multiple non-overlapping regions, a memory array configured to store partition information, where the partition information comprises entries that each include an entity identifier and cache configuration information associated with the entity identifier, and a controller configured to access the cache and the memory array. The controller is configured to manage memory requests originating from the processor cores. The managing includes: for at least a first memory request, comparing at least a portion of an address included in the first memory request with tags stored in the cache to determine whether the first memory request results in a hit or a miss, and comparing an entity identifier included in the first memory request with entity identifiers stored in the memory array to determine a matched entry, and for at least a first matched entry for the first memory request, updating the cache configuration information associated with the entity identifier in the first matched entry based at least in part on a hit or miss result for the first memory request. At least some of the entity identifiers are derived at least in part from an associated one of the core-specific identifiers. The cache configuration information associated with a particular entity identifier includes cache usage information that tracks usage of the cache by an entity associated with the particular entity identifier, and a plurality of partition descriptors that each define a different group of one or more of the regions.

In another aspect, in general, a method for managing a shared memory system accessible by a plurality of processor cores includes: storing, in storage of one or more of the plurality of processor cores, at least one core-specific identifier; and managing a shared memory system connected by interconnection circuitry to each of the plurality of processor cores. The managing system includes: operating a cache shared by more than one of the plurality of processor cores, the cache comprising multiple non-overlapping regions, storing partition information in a memory array, where the partition information comprises entries that each include an entity identifier and cache configuration information associated with the entity identifier, and operating a controller to access the cache and the memory array. The controller manages memory requests originating from the processor cores. The managing includes: for at least a first memory request, comparing at least a portion of an address included in the first memory request with tags stored in the cache to determine whether the first memory request results in a hit or a miss, and comparing an entity identifier included in the first memory request with entity identifiers stored in the memory array to determine a matched entry, and for at least a first matched entry for the first memory request, updating the cache configuration information associated with the entity identifier in the first matched entry based at least in part on a hit or miss result for the first memory request. At least some of the entity identifiers are derived at least in part from an associated one of the core-specific identifiers. The cache configuration information associated with a particular entity identifier includes cache usage information that tracks usage of the cache by an entity associated with the particular entity identifier, and a plurality of partition descriptors that each define a different group of one or more of the regions.

Aspects can include one or more of the following features.

The cache configuration information associated with a particular entity identifier includes: the cache usage information that contains a plurality of values for tracking at least two of: a total number of hits, a total number of misses, or a total number of memory requests, at least one threshold on a value that represents a ratio of hits to total memory requests or a ratio of misses to total memory requests, and the plurality of partition descriptors that each define a different group of one or more of the regions within which an entity associated with the particular entity identifier is allowed to allocate a cache line.

Each of the plurality of processor cores includes storage configured to store multiple core-specific identifiers.

The controller is configured to manage memory requests originating from the processor cores and memory requests originating from outside the processor cores.

Every entity is allowed to read a cache line in any of the one or more regions.

The controller is configured to manage memory requests originating from the processor cores and memory requests originating from outside the processor cores.

The memory requests originating from outside the processor cores are provided by an input/output bridge coupled to the interconnection circuitry.

At least some of the entity identifiers are derived at least in part from an associated one of the core-specific identifiers and at least in part from information indicating whether a memory request that includes a particular entity identifier is associated with a request for data or a request for one or more instructions.

The cache comprises a set associative cache, and the multiple non-overlapping regions comprise ways of the set associative cache.

Aspects can have one or more of the following advantages.

Previous techniques for monitoring performance of various entities with respect to cache usage are limited in their ability to apply that cache usage information effectively for cache partitioning. The techniques described herein are able to facilitate dynamic cache partitioning that is managed without requiring intervention by software. A given cache module can be configured to dynamically adjust cache allocation for a variety of entities, including entities outside of the processor cores, such as an entity accessing the cache via an input/output bridge. Assignment of entities can be based on a variety of characteristics including both hardware characteristics (e.g., different processor cores) and access characteristics (e.g., access of cached data vs. cached instructions).

Other features and advantages of the invention will become apparent from the following description, and from the claims.

DESCRIPTION

Figure 1:
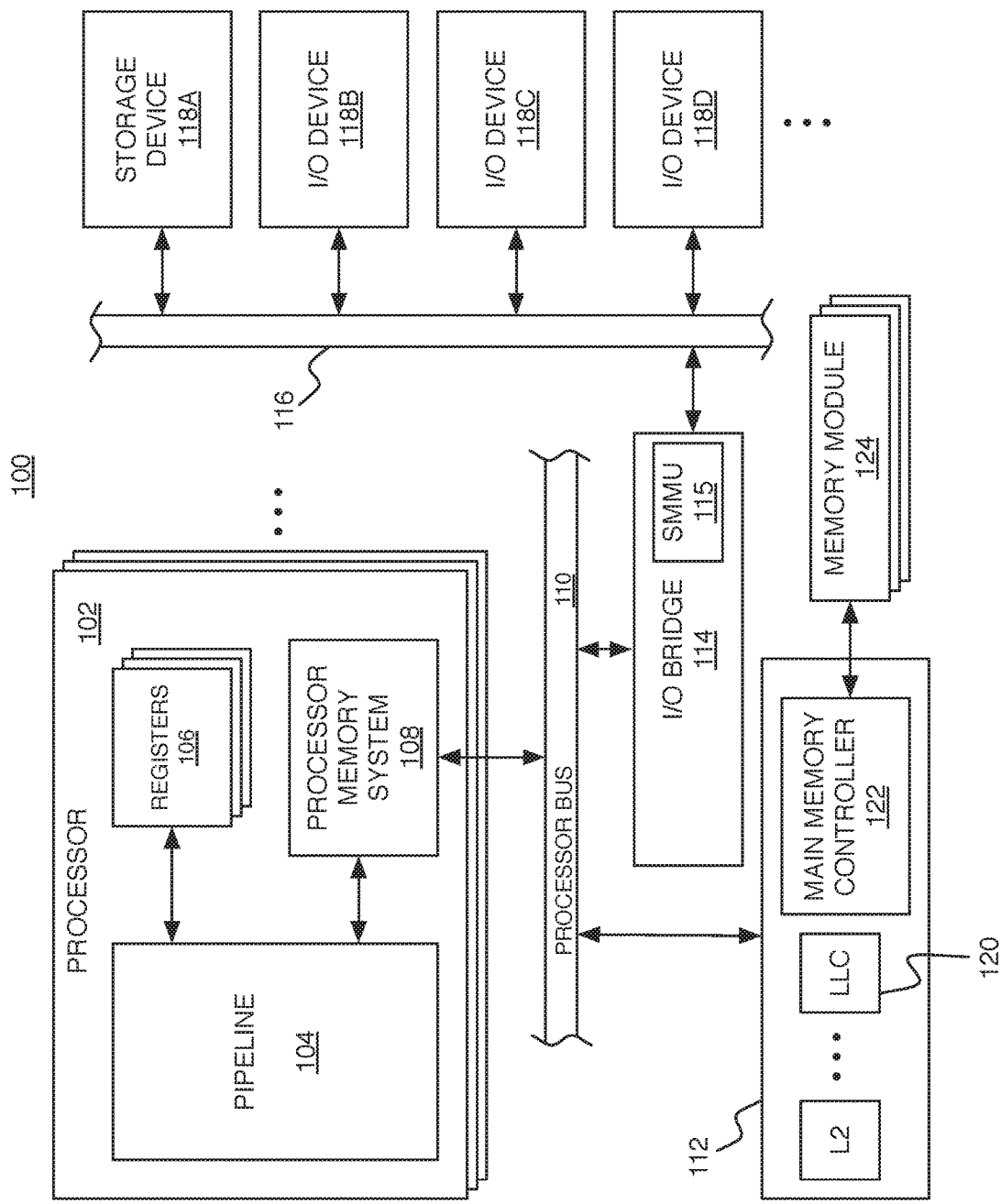
FIG. 1 is a schematic diagram of a computing system.

FIG. 1 shows an example of a computing system 100 in which cache partitioning techniques can be used. The system 100 includes at least one processor, which could be a single central processing unit (CPU), or one of multiple processor cores 102 in a multi-core architecture, as shown in FIG. 1. In this example, the processor core 102 includes a pipeline 104, a group of registers 106, and a processor memory system 108. The processor core 102 is connected to a processor bus 110, which enables communication with an external memory system 112 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). A system memory management unit (SMMU) 115 present within the I/O bridge 114 manages I/O related memory requests. The storage device 118A such as a disk drive or other large capacity (typically non-volatile) storage device can spare some space to serve as secondary storage (or a 'backing store') in a virtual memory scheme for the (typically volatile) main memory, as described in more detail below.

The registers 106 can be arranged in any of a variety of configurations and accessible by various parts of the processor core 102. In some implementations, the registers 106 include one or more register files. The registers 106 can be configured for various purposes. For example, some of the registers 106 are general purpose registers accessible by the pipeline 104. The registers 106 can also include registers that are dedicated for storing important values such as a stack pointer, and a program counter. The registers 106 can also include various special purpose registers, including registers storing values used for cache partitioning, which are described in more detail below.

The processor memory system 108 and external memory system 112 together form a hierarchical cache system including at least a first level (L1) cache within the processor memory system 108, and any number of higher level (L2, L3, . . . ) caches within the external memory system 112. The highest level cache within the external memory system 112 (which may be the L12 cache if there are only two levels in the hierarchy) is the LLC 120, which is accessed just before main memory. Of course, this is only an example. The exact division between which level caches are within the processor memory system 108 and which are in the external memory system 112 can be different in other examples. For example, the L1 cache and the L2 cache could both be internal to the processor core 102, and the L3 (and higher) caches could be external to the processor core 102. Each processor core 102 could have its own internal L1 cache, and multiple processor cores could share an L2 cache. The external memory system 112 also includes a main memory controller 122, which is connected to any number of memory modules 124 serving as main memory (e.g., Dynamic Random Access Memory modules).

In some implementations of the computing system 100, there can be multiple sets of processor cores 102 included on separate "sockets" (not shown) that each have their own external memory system 112 connected to the set of processor cores over their own processor bus 110. Processor cores would send "local requests" to access addresses associated with memory modules 124 connected to the main memory controller 122 of their "local socket" on which they are contained. Processor cores on different sockets can also send "remote requests" to access addresses associated with different memory modules 124 connected to "remote sockets."

The size of the main memory allows for a "physical address space" of a certain size. But, that physical memory can be virtualized using a "virtual memory" scheme, which allows executing processes to refer to virtual addresses within a "virtual address space" that is larger than the physical address space. Virtual memory involves address translation from one or more such virtual address spaces into the physical address space. The translation is performed using a "page table" that stores mappings between virtual addresses and physical addresses at a granularity of memory pages (or simply "pages").

A variety of entities can be defined for tracking cache usage information and for applying that tracked cache usage information to cache partitioning. For example, each processor core can be defined as an entity. Additionally, other entities can be based on certain types of programs executing on the processor cores. One type of entity that is supported by some processors is called a virtual machine (VM). Multiple VMs can share the same physical system hardware, such as a processor core. Alternatively, different VMs can be assigned different processor cores, such as four different VMs each being assigned a different set of 6 processor cores in a processor with 24 total cores. In either case, different VMs could share certain physical hardware, such as a cache module within the hierarchical cache system. In such systems, a hypervisor (also called a virtual machine monitor (VMM)) runs on the physical system to manage all of the guest operating systems running within respective VMs. The hypervisor runs at higher-privileged access level than the guest operating systems. Only the hypervisor has access to the physical address space. Therefore, each guest operating system is provided its own "intermediate physical address space" into which one or more virtual address spaces are translated, and the hypervisor translates intermediate physical addresses into physical addresses.

Figure 2:
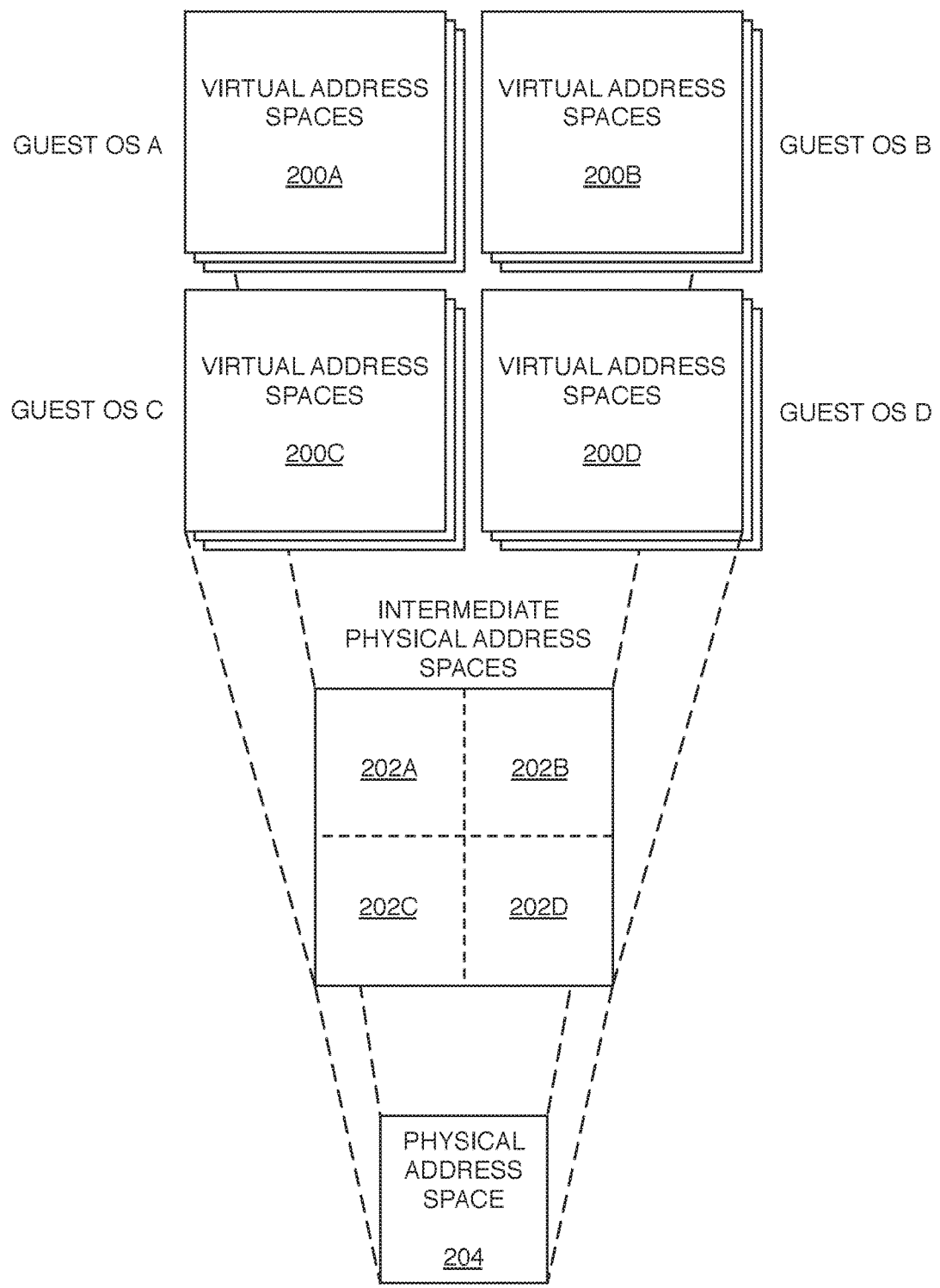
FIG. 2 is a schematic diagram illustrating different levels of address spaces.

FIG. 2 illustrates relationships among different address spaces in an example of a virtualized system with multiple VMs. As described above, there are three types of addresses: virtual address (VA), intermediate physical address (IPA), and physical address (PA). One or more guest operating systems (OSs) run within the hypervisor, which runs directly on the host such as computing system 100. In this example, there are four guest OSs: guest OS A, guest OS B, guest OS C, and guest OSD. Each guest OS provides one or more virtual address spaces for programs running in that guest OS, and manages translation of VAs within those virtual address spaces to IPAs within an intermediate physical address space. In this example, guest OS A provides virtual address spaces 200A, and manages translations to intermediate physical address space 202A; guest OS B provides virtual address spaces 200B, and manages translations to intermediate physical address space 202B; guest OS C provides virtual address spaces 200C, and manages translations to intermediate physical address space 202C; and guest OS D provides virtual address spaces 200D, and manages translations to intermediate physical address space 202D. The hypervisor running underneath each guest operating system manages translation of IPAs within all of the intermediate physical address spaces to PAs within the physical address space 204 corresponding to the actual physical storage locations within main memory. Portions of the PA can be used as tags, indexes, and offsets to access data in a cache in the cache system, such as the LLC 120.

Other examples of entities, in addition to individual processor cores, can include VMs executing on one or more processor cores, threads executing on the same processor core, or individual I/O devices. For example, some operating systems treat hardware threads executing on the same processor core as "virtual cores."

Figure 3:
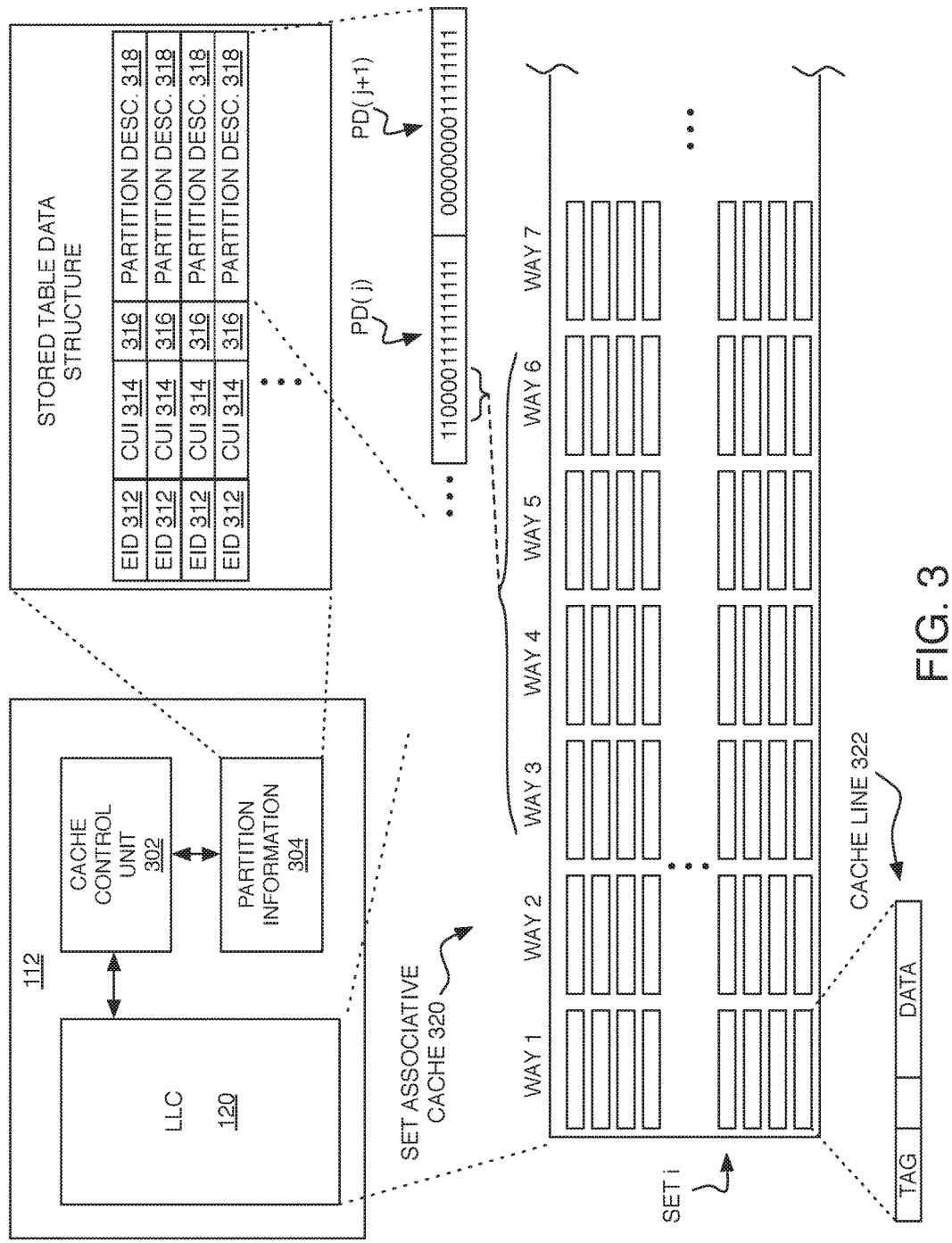
FIG. 3 is a schematic diagram illustrating a procedure for managing cache partitions using partition information that includes cache usage information and partition descriptors.

FIG. 3 illustrates an example of a procedure for dynamically partitioning a cache based on cache usage information. In this example, cache partitioning will be applied to the LLC 120, but in other examples any cache module at any level of the hierarchy that is potentially shared by multiple entities can be partitioned in a similar manner. The external memory system 112 includes a cache control unit (CCU) 302 that is configured to control the LLC 120. The CCU 302 receives requests to access memory addresses (e.g., some or all of a physical and/or virtual memory address, depending on whether the cache is virtually or physical indexed, and whether the cache is virtually or physically tagged). Entries of a cache start "unused" or "empty," and are filled as different cache lines containing values (data or instructions) at a requested memory address are allocated. If a requested address is present in the LLC 120 (i.e., a cache hit), that implies that the cache line containing the requested address has previously been allocated by some entity. If the request was a read request, the value at the address is read from the cache; or if the request was a write request, the value at the address is written to the cache (and potentially eventually written back to main memory according to a write policy). If the requested address is not present in the LLC 120 (i.e., a cache miss), that implies that the cache line containing the requested address has either not previously been allocated or was evicted in order to allocate some other cache line. Allocation of a cache line after a miss is dynamically controlled based on partition information 304, as described in more detail below.

The request sent to the CCU 302 will also include an entity identifier (EID) that corresponds to an entity making the request. The size of the EID determines the number of entities that can be assigned partitions. For example, an 8-bit ED enables 256 entities to have an entry within the partition information 304 stored in a memory array (e.g., implemented using Random Access Memory (RAM) circuitry, such as a Static RAM module or other circuitry configured to store an array). The EID is computed based on various parameters associated with the requesting entity. For example, if the EID corresponds to an entity executing on a particular processor core, a core-specific identifier stored in a special purpose register in that processor core may be used. There may be multiple different registers storing different core-specific identifiers associated with different "exception levels" (also called "privilege levels" or "access levels") of the requesting entity. For example, there may be a lowest-privileged exception level EL0 for user programs running in a guest OS, an exception level EL1 for a guest OS, an exception level EL2 for a hypervisor, and a highest-privileged exception level EL3 for a security system. One register may store a valued used to compute an EID for requesting entities at exception levels EL0, EL1, and EL2, and another register may store a value used to compute an EID for an entity at exception level EL3.

Other parameters can also be used to compute an EID. An "I/D bit" can be used, indicating whether the request is associated with a stored instruction (using an I-value of the I/I bit) or associated with a stored data value (using a D-value of the I/D bit). This ID bit enables the regions into which the LLC 120 is partitioned to form effective instruction cache or data cache sub-regions. The same program can therefore be configured act as two different entities with respect to cache partitioning, such as in the case of self-modifying code that sends write requests using the D-value of the I/D bit and sends read requests using I-value of the I/ID bit. The ID bit can be used for computing the EID in any of a variety of ways, such as concatenating the bit with a 7-bit core-specific identifier, yielding an 8-bit EID.

If the EID corresponds to an entity outside of the processor cores, other parameters can be used to compute the EID, such as quality of service (QoS) parameter for an entity providing a request over the I/O bridge 114. In some implementations this QoS parameter or EID is retrieved by tables retrieved by the SMMU 115, and the SMMU 115 determines a unique QoS or EID value for each I/O device (e.g., devices 118A, 118B, 118C, and 118D).

The CCU 302 is coupled to the memory array storing the partition information 304. The location of that memory array closely coupled to, within circuitry of, or otherwise in proximity to the LLC 120 and/or the CCU 302 (e.g., as opposed to being located within each processor cores 102) provides a conveniently accessible and centralized location for storing partition information that may be associated with any entity, whether that entity is associated with a processor core on the same or a different socket or associated with a device outside of any processor core. The partition information 304 is, in some implementations, accessed within the memory array as a table data structure with rows that are indexed by a field (or "column") that stores the EID) 312. Each row also includes fields storing cache configuration information that represents enough information for dynamically determining a configuration of the regions in the LLC 120 that will be part of the partition assigned to a corresponding uniquely identified entity. As described above, this assigned partition (which may overlap with partitions assigned to other entities) represents the regions within the LLC 120 in which the corresponding entity is allowed to store new cache lines, if necessary, evicting old cache lines to do so.

In this example, the configuration information includes the following additional fields within a row having a particular value of the EID 312.

A group of fields store cache usage information (CUI) 314. The CUI 314 tracks usage of the LLC 120 by the entity uniquely identified by the particular EID 312. The CCU 302 is configured to update the CUI 314 in response to each request to access the LLC 120. For example, in some implementations, the CUI 314 stores two different counts that can be used to compute an approximate hit ratio characterizing results of requests to the LLC 120 by the entity. One field would store a count of a total number of hits H resulting from requests by the entity. Another field would store a count of a total number of misses M resulting from requests by the entity. The hit ratio is then computed as H/(H+M). Alternatively, instead of counting both hits and misses, only one of them is counted, and a total number of memory requests (H+M) is also counted, which also enables computation of the hit ratio (or equivalently a miss ratio M/(H+M)). In some implementations, the EID in the request is compared with EIDs in the table concurrently with comparison of the address in the request to index and tag bits in the LLC 120, as described in more detail below. If a matched entry is found, the hit count H or miss count M is incremented in the table accordingly after determining whether there is a hit or miss in the LLC 120. In alternative implementations, an approximation or equivalent to the number of hits or misses can be counted, such as counting the number of allocations into the LLC 120 of a data or instruction value retrieved from main memory that occur after a miss. Certain types of activity associated with the LLC 120 does not necessarily increment either the hit or miss counts, such as certain activity associated with "victims" and "forwards."

Configuration fields 316 store one or more thresholds for comparing against the hit ratio (or miss ratio). If the threshold is exceeded, an update of a selection from partition descriptors 318 is performed. The CCU 302 can be configured to perform this comparison and potential update for every received request to access the LLC 120. If the request results in a miss, this comparison and potential update can be performed during the relatively long time needed for the requested data or instruction to be retrieved from main memory, without incurring additional delay. If the request results in a hit, this comparison and update can still be performed concurrently with other activity (e.g., execution of an instruction within the pipeline 104), but may result in an additional delay. But, the cost of any additional delay may be worthwhile to achieve a more efficient partitioning after updating a selection from the partition descriptors 318. In some implementations, comparison of an updated hit ratio to one or more thresholds is performed after every miss but only selectively after certain hits (e.g., after a certain number of hits, or after certain amount of time since the last hit). Alternatively, comparison of an updated hit ratio to one or more thresholds can be performed selectively regardless of whether there was a hit or a miss.

A group of fields store multiple partition descriptors 318. For a row corresponding to a particular entity, each partition descriptor defines a different group of one or more regions within the LLC 120, called a "partition," within which the entity associated with the matched EID 312 is allowed to allocate cache lines. The manner in which the LLC 120 is divided into non-overlapping regions depends on its structure, as described in more detail below. Different partitions, each defined by a different partition descriptor, can overlap with other partitions, whether those other partitions are associated with the same EID (i.e., in the same row in the table) or different EIDs (i.e., in different rows in the table). At any given time, one of the multiple partition descriptors 318 in a row for an entity with a particular EID is selected as the "active partition descriptor" for that entity. For example, an appropriate number of bits are stored in one of the configuration fields 316 to enable indication of one of the partition descriptors 318 as active. Updating this field to indicate a that a different partition descriptor has been selected as the new active partition descriptor is performed only if the result of the threshold comparison indicates that a change is warranted.

The LLC 120 can be configured using any of a variety of cache structures, and the manner in which its non-overlapping regions are identified by the partition descriptor may depend on that cache structure. In this example, the LLC 120 includes a structure that has circuitry implementing an N-way set associative cache 320, and the non-overlapping regions are called "ways" within the cache 320. Each cache line 322 within this cache 320 includes bits for storing the data words of that particular cache line 322, bits for a tag (which contains a number of the most significant bits of an address, which are common to the words of that entry), and bits for other information (e.g., a valid bit and any flags or error correction code bits). Before comparing a tag portion of a memory address within a request to find a match to the stored tags (in the case of a hit), circuitry of the cache 320 compares an index portion of the address (a number of bits between the tag bits and the least significant bits) to determine in which of multiple "sets" the cache line containing that data may be stored (e.g., SET i in FIG. 3). For N ways of the cache 320, the tag comparison is performed N times (possibly in parallel), once for each of the N ways in which the cache line containing the data may be stored. The lowest order bits of an address (also called a "block offset") are used to select a particular word from a cache line that is found in the cache (i.e., a cache hit). If the cache line is not found in the LLC 120 (i.e., a cache miss), then the cache system attempts to retrieve the cache line from the main memory. But, the retrieved cache line is only allocated to a cache line of the indexed set and a way that is included in its active partition descriptor. This allocating of a retrieved cache line may evict an old cache line (e.g., the least recently used cache line for an LRU replacement policy) within the one or more ways indicated, if necessary, in the event that no entries without allocated cache lines are available. Thus, a particular entity that is allowed to allocate into a particular group of ways by its active partition descriptor is prevented from evicting from cache lines allocated by other entities that are not included in that particular group of ways.

FIG. 3 shows an example of two different partition descriptors PD(j) and PD(j+1) for the case of N=16, where PD is a vector containing partition descriptors 318, with different indices corresponding to different elements in the vector. The active partition descriptor can be selected by storing its index (as a binary value) in one of the configuration fields 316 (e.g., j=0 selecting the first element in the vector). In the illustrated example, PD(j) is in the form a "way mask" with four bits set to zero '0' to indicate that only the corresponding ways (WAY 3 to WAY 6) are available to the entity with the stored EID 312 for allocating retrieved cache lines (after a miss), with all other bits set to one '1' to indicate that they are not available for allocating retrieved cache lines. But, again, all ways are available to that entity for accessing (reading or writing) cache lines already allocated (after a hit). The alternative way mask represented by PD(j+1) has an expanded group of ways (WAY 1 to WAY 8) indicated as available for allocating.

The CCU 302 is configured to change the active partition descriptor in response to an updated hit ratio crossing (i.e., rising above, or falling below) a threshold stored in one of the configuration fields 316. For example, the CCU 302 may be configured to change the active partition descriptor of an entity from PD(j) to PD(j+1), allowing more ways for cache line allocation, after an updated hit ratio of the entity drops below a stored threshold. The low hit ratio may indicate that too many cache lines are being evicted, and more ways could reduce the likelihood of eviction. Alternatively, hit ratios of other entities can be used to change the active partition descriptor. For example, if a particular entity is found to have a much higher hit ratio than other entities, that particular entity may have its active partition descriptor changed to reduce the ways allowed for cache line allocation, and/or other entities may have their active partition descriptors changed to increase the ways allowed for cache line allocation.

There may also be other reasons why different partition descriptors 318 are stored. For example, one partition descriptor may be used if the entity associated with the matched EID 312 has certain characteristics (e.g., executing on a processor core of a local socket associated with the LLC 120) and another partition descriptor may be used if the entity associated with the matched EID) 312 has other characteristics (e.g., executing on a processor core of a remote socket). Different partition descriptors can also have different sizes for partitioning different regions of the LLC 120. If the partition descriptors 318 are way masks, for example, different way masks can have different sizes, with each being associated with a different cache structure that has a different number of ways. For example, there may be multiple caches within the hierarchy being partitioned, including one or more caches at a lower level than the LLC 120, each with a different number of ways. Alternatively, the LLC 120 may consist of different parallel cache structures for different purposes, each with a different number of ways, such as instruction LLC and a data LLC.

The partition information 304 may be initialized using certain default values for all of the fields in the table. In some implementations, the active partition descriptor all entities can initially be set to allow all ways for allocation (i.e., a way mask with all bits set to zero) by default, to start with no partitioning being used (or a single completely overlapping partition for all entities). Entities would then be dynamically partitioned, incrementally, based on changing CU 314. Alternatively, entities may start with small (possibly non-overlapping) partitions initially, which grow to use larger (possibly overlapping) partitions, again based on changing CUI 314. Also, when certain information in the table (e.g., the partition descriptors 318) is initialized or changed, the counters for computing hit ratio can be reset to zero. In some implementations, the ability to change some or all fields of the partition information 304 can be protected, for example, by limiting changes to a high exception level (e.g., EL3), with lower exception levels able to request changes be made at a higher exception level by making a request via software executing at the lower exception level to software executing at the higher exception level.

Other forms of partitioning can be combined with the cache partitioning described herein. For example, memory bandwidth can be partitioned by assigning certain entities limits on memory bandwidth that they are allowed to use, such as an assigned fraction of a total memory bandwidth. Additionally, bandwidth associated with I/O can be partitioned, or bandwidth associated with a particular I/O device such as a storage device 118A (e.g., disk drive bandwidth). Other resources can be partitioned, including partitioning core resources among multiple threads executing on a single processor core.

Other embodiments may fall within the scope of the following claims, which do not necessarily include all of the features or advantages of the embodiments described above.

What is claimed is:

1. An apparatus comprising:
a plurality of processor cores, with each of the plurality of processor cores including storage configured to store at least one core-specific identifier; and
a shared memory system connected by interconnection circuitry to each of the plurality of processor cores, the shared memory system including:
a cache shared by more than one of the plurality of processor cores, the cache comprising multiple non-overlapping regions,
a memory array configured to store partition information, where the partition information comprises entries that each include an entity identifier and cache configuration information associated with the entity identifier, and
a controller configured to access the cache and the memory array;
wherein the controller is configured to manage memory requests originating from the processor cores, where the managing includes:
for at least a first memory request, comparing at least a portion of an address included in the first memory request with tags stored in the cache to determine whether the first memory request results in a hit or a miss, and comparing an entity identifier included in the first memory request with entity identifiers stored in the memory array to determine a matched entry, and
for at least a first matched entry for the first memory request, updating the cache configuration information associated with the entity identifier in the first matched entry based at least in part on a hit or miss result for the first memory request;
wherein at least some of the entity identifiers are derived at least in part from an associated one of the core-specific identifiers; and
wherein the cache configuration information associated with a particular entity identifier includes cache usage information that tracks usage of the cache by an entity associated with the particular entity identifier, and a plurality of partition descriptors that each define a different group of one or more of the regions.

2. The apparatus of claim 1, wherein the cache configuration information associated with a particular entity identifier includes:
the cache usage information that contains a plurality of values for tracking at least two of: a total number of hits, a total number of misses, or a total number of memory requests,
at least one threshold on a value that represents a ratio of hits to total memory requests or a ratio of misses to total memory requests, and the plurality of partition descriptors that each define a different group of one or more of the regions within which an entity associated with the particular entity identifier is allowed to allocate a cache line.

3. The apparatus of claim 2, wherein each of the plurality of processor cores includes storage configured to store multiple core-specific identifiers.

4. The apparatus of claim 3, wherein the controller is configured to manage memory requests originating from the processor cores and memory requests originating from outside the processor cores.

5. The apparatus of claim 2, wherein every entity is allowed to read a cache line in any of the one or more regions.

6. The apparatus of claim 1, wherein each of the plurality of processor cores includes storage configured to store multiple core-specific identifiers.

7. The apparatus of claim 1, wherein the controller is configured to manage memory requests originating from the processor cores and memory requests originating from outside the processor cores.

8. The apparatus of claim 7, wherein the memory requests originating from outside the processor cores are provided by an input/output bridge coupled to the interconnection circuitry.

9. The apparatus of claim 1, wherein at least some of the entity identifiers are derived at least in part from an associated one of the core-specific identifiers and at least in part from information indicating whether a memory request that includes a particular entity identifier is associated with a request for data or a request for one or more instructions.

10. The apparatus of claim 1, wherein the cache comprises a set associative cache, and the multiple non-overlapping regions comprise ways of the set associative cache.

11. A method for managing a shared memory system accessible by a plurality of processor cores, the method comprising:
storing, in storage of one or more of the plurality of processor cores, at least one core-specific identifier; and
managing a shared memory system connected by interconnection circuitry to each of the plurality of processor cores, the managing system including:
operating a cache shared by more than one of the plurality of processor cores, the cache comprising multiple non-overlapping regions,
storing partition information in a memory array, where the partition information comprises entries that each include an entity identifier and cache configuration information associated with the entity identifier, and
operating a controller to access the cache and the memory array;
wherein the controller manages memory requests originating from the processor cores, where the managing includes:
for at least a first memory request, comparing at least a portion of an address included in the first memory request with tags stored in the cache to determine whether the first memory request results in a hit or a miss, and comparing an entity identifier included in the first memory request with entity identifiers stored in the memory array to determine a matched entry, and
for at least a first matched entry for the first memory request, updating the cache configuration information associated with the entity identifier in the first matched entry based at least in part on a hit or miss result for the first memory request;
wherein at least some of the entity identifiers are derived at least in part from an associated one of the core-specific identifiers; and
wherein the cache configuration information associated with a particular entity identifier includes cache usage information that tracks usage of the cache by an entity associated with the particular entity identifier, and a plurality of partition descriptors that each define a different group of one or more of the regions.

12. The method of claim 11, wherein the cache configuration information associated with a particular entity identifier includes:
the cache usage information that contains a plurality of values for tracking at least two of: a total number of hits, a total number of misses, or a total number of memory requests,
at least one threshold on a value that represents a ratio of hits to total memory requests or a ratio of misses to total memory requests, and
the plurality of partition descriptors that each define a different group of one or more of the regions within which an entity associated with the particular entity identifier is allowed to allocate a cache line.

13. The method of claim 12, wherein each of the plurality of processor cores includes storage configured to store multiple core-specific identifiers.

14. The method of claim 13, wherein the controller manages memory requests originating from the processor cores and memory requests originating from outside the processor cores.

15. The method of claim 12, wherein every entity is allowed to read a cache line in any of the one or more regions.

16. The method of claim 11, wherein each of the plurality of processor cores includes storage configured to store multiple core-specific identifiers.

17. The method of claim 11, wherein the controller manages memory requests originating from the processor cores and memory requests originating from outside the processor cores.

18. The method of claim 17, wherein the memory requests originating from outside the processor cores are provided by an input/output bridge coupled to the interconnection circuitry.

19. The method of claim 11, wherein at least some of the entity identifiers are derived at least in part from an associated one of the core-specific identifiers and at least in part from information indicating whether a memory request that includes a particular entity identifier is associated with a request for data or a request for one or more instructions.

20. The method of claim 11, wherein the cache comprises a set associative cache, and the multiple non-overlapping regions comprise ways of the set associative cache.

* * * * *